United States Patent
Tanase et al.

(10) Patent No.: US 10,713,546 B2
(45) Date of Patent: Jul. 14, 2020

(54) PRINTING APPARATUS AND METHOD OF PRINTING

(71) Applicant: SEIKO EPSON CORPORATION, Tokyo (JP)

(72) Inventors: Kazuyoshi Tanase, Nagano (JP); Akira Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/283,894

(22) Filed: Feb. 25, 2019

(65) Prior Publication Data
US 2019/0263139 A1   Aug. 29, 2019

(30) Foreign Application Priority Data
Feb. 26, 2018 (JP) .................................. 2018-031607

(51) Int. Cl.
*G06K 15/10* (2006.01)
*B41J 2/21* (2006.01)

(52) U.S. Cl.
CPC .......... *G06K 15/102* (2013.01); *B41J 2/2103* (2013.01)

(58) Field of Classification Search
CPC ... G06K 15/102; G06K 15/107; B41J 2/2103; B41J 2/2132; B41J 2/2121
See application file for complete search history.

(56) References Cited

U.S. PATENT DOCUMENTS

| 5,748,207 A * | 5/1998 | Inui ..................... B41J 2/2132 347/40 |
| 2002/0018088 A1* | 2/2002 | Takahashi ............ G06K 15/102 347/15 |
| 2017/0087869 A1* | 3/2017 | Suzuki ................... B41J 2/2103 |

FOREIGN PATENT DOCUMENTS

JP   2011-167896 A   9/2011

* cited by examiner

*Primary Examiner* — Justin Seo
(74) *Attorney, Agent, or Firm* — Global IP Counselors, LLP

(57) ABSTRACT

A printing apparatus configured to print an image by discharging inks of different colors from a printing head onto a printing medium includes an edge extractor that extracts an edge pixel constituting a contour of the image from image data and a dot data generator that generates dot data indicating the recording state of dots corresponding to the image data. The dot data generator performs edge processing on a pixel in the image data to reduce the volume of inks discharged when the pixel is the edge pixel to a value that is the product of the volume of inks discharged when the pixel is a non-edge pixel and a coefficient, and the edge processing includes edge processing for maximum brightness for making a minimum value of the coefficient for when the inks discharged onto the edge pixel includes a maximum brightness ink having a highest brightness among the inks of different colors smaller than the minimum value of the coefficient for when the inks discharged onto the edge pixel do not include the maximum brightness ink.

6 Claims, 14 Drawing Sheets

PRINTING APPARATUS AND METHOD OF PRINTING

BACKGROUND

1. Technical Field

The present disclosure relates to a printing apparatus and a method of printing.

2. Related Art

A technique for an apparatus that prints an image by discharging ink droplets onto a printing medium to form dots is known that suppresses bleeding occurring at edges by reducing the number of dots formed at edge portions of an image.

CITATION LIST

Patent Literature

[PTL 1] JP-A-2011-167896

As a result of a study conducted by the inventors, it has become clear that ink bleeding is more likely to occur when a maximum brightness ink having the highest brightness among inks of different colors is discharged onto the edges.

SUMMARY

An exemplary embodiment of the present disclosure provides a printing apparatus configured to print an image by discharging inks from a printing head including nozzles respectively discharging the inks of different colors onto a printing medium to form multiple dots. The printing apparatus includes an edge extractor configured to extract an edge pixel constituting a contour of the image from image data, and a dot data generator configured to generate dot data indicating a recording state of a plurality of dots corresponding to the image data, the dot data being for forming the plurality of dots on the printing medium. The dot data generator performs edge processing on a pixel in the image data to reduce a volume of ink discharged when the pixel is the edge pixel to a value that is the product of a volume of ink discharged when the pixel is a non-edge pixel and a coefficient, and the edge processing includes edge processing for maximum brightness ink for making a minimum value of the coefficient for when the inks discharged onto the edge pixel include a maximum brightness ink having a highest brightness among the inks of different colors smaller than a minimum value of the coefficient for when the inks discharged onto the edge pixel do not include the maximum brightness ink.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

Figure 1:
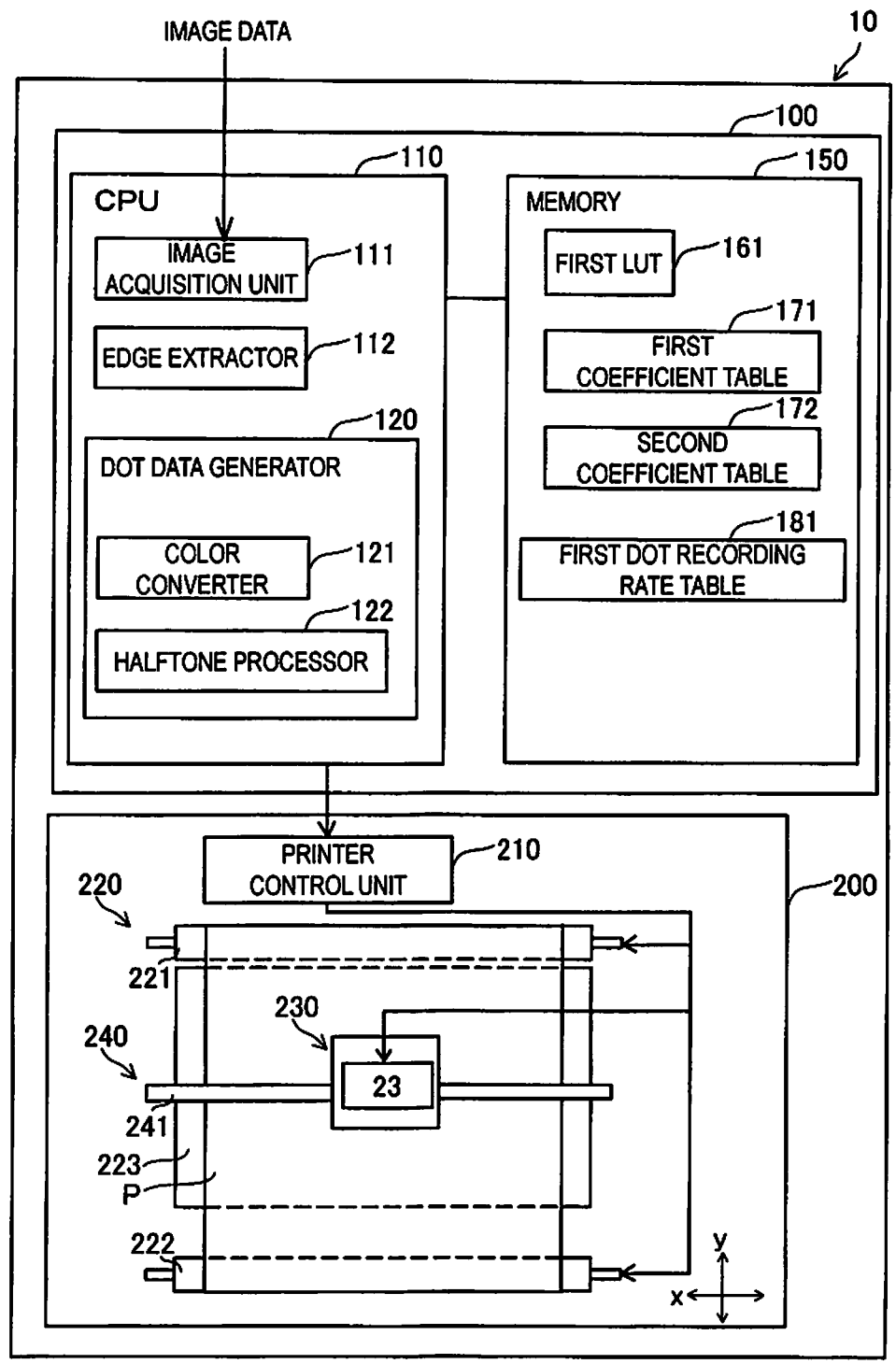
FIG. 1 is a diagram illustrating a schematic configuration of a printing system according to a first exemplary embodiment.

FIG. 1 is a diagram illustrating a schematic configuration of a printing apparatus 10 according to an exemplary embodiment of the invention. The printing system 10 according to this exemplary embodiment includes an image processing device 100 and a printer 200 that actually prints images under the control of the image processing device 100. The printing system 10 comprehensively functions as a printing apparatus in a broad sense.

The printer 200 includes a printer control unit 210, a conveying unit 220, a carriage shifting unit 240, and carriage 230 including a printing head 23.

The printer control unit 210 is a computer including a CPU, a memory, and an input/output interface and controls the conveying unit 220, the carriage shifting unit 240, and the printing head 23 based on print data received from the image processing device 100.

The conveying unit 220 includes a supplying roller 221 around which a printing medium P is wound, a storing roller 222 that stores the conveyed printing medium P in the form of a roll, and a platen 223 that supports the printing medium P. The conveying unit 220 conveys the printing medium P from the supplying roller 221 to the supplying roller 222 and moves the printing medium P in a sub-scanning direction y under the control of the printer control unit 210.

The carriage shifting unit 240 includes a carriage guide shaft 241 and a carriage motor (not illustrated). The carriage guide shaft 241 is disposed along a main scanning direction x intersecting the sub-scanning direction y, and the two end portions thereof are fixed to the housing of the printer 200. The main scanning direction x is also the width direction of the printing medium P. The carriage 230 is attached to the carriage guide shaft 241 such that it is reciprocatable in the main scanning direction x. The carriage shifting unit 240 drives the carriage motor and reciprocates the carriage 230 in the main scanning direction x under the control of the printer control unit 210.

The printing head 23 provided in the carriage 230 discharges ink droplets onto the printing medium P to form dots under the control of the printer control unit 210.

Figure 2:
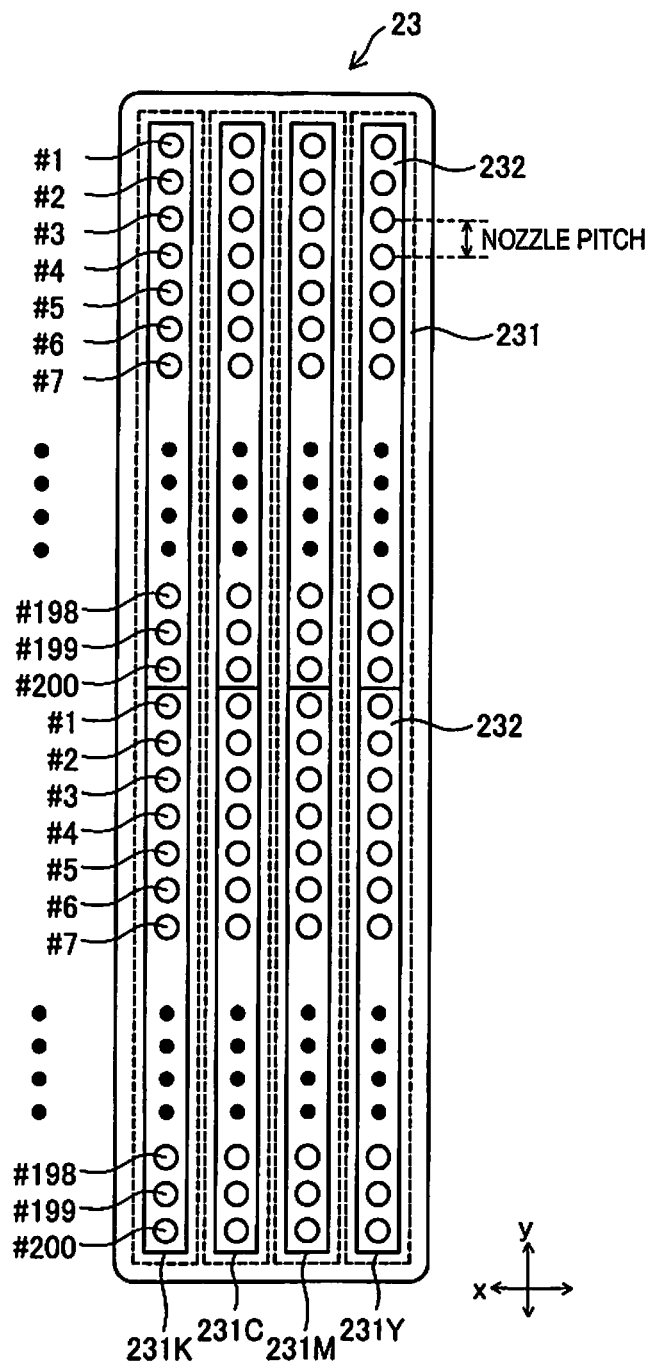
FIG. 2 is a schematic diagram illustrating an example of an array of the nozzles of a printing head.

FIG. 2 is a schematic diagram illustrating an example of an array of nozzles of a printing head 23. FIG. 2 illustrates a face of the printing head 23 facing the printing medium P. With reference to FIG. 2, the printing head 23 includes a plurality of nozzle arrays 231. The plurality of nozzle arrays 231 include a nozzle array 231K for black ink K, a nozzle array 231C for cyan ink C, a nozzle array 231M for magenta ink, and a nozzle array 231Y for yellow ink Y. In this exemplary embodiment, the yellow ink Y has the highest brightness among the black ink K, the cyan ink C, the magenta ink M, and the yellow ink Y, and thus, the yellow ink Y is the maximum brightness ink. Each of the nozzle arrays 231 includes two nozzle chips 232 aligned in the sub-scanning direction y. The nozzle chips 232 each include 200 nozzles from #1 to #200 disposed at a predetermined pitch along the sub-scanning direction y. Each of the nozzles is provided with a piezoelectric element for driving the nozzles to discharge ink. Each nozzle receives an ink of one of the colors from a corresponding ink tank (not illustrated). Each nozzle discharges one of the black ink K, the cyan ink C, the magenta ink M, and the yellow ink Y as a result of the driving by the corresponding piezoelectric element under the control of the printer control unit 210. It should be noted that the method of discharging ink may be any method including a thermal method of discharging ink by generating air bubbles in the nozzles with heating elements.

With the above-described configuration, the printer control unit 210 instructs the conveying unit 220 to convey the printing medium P in the sub-scanning direction y, the carriage shifting unit 240 to convey the printing head 23 provided on the carriage 230 in the main scanning direction x, and discharge ink from the nozzles of the printing head 23 to form dots, to print an image on the printing medium P.

Referring back to FIG. 1, the image processing device 100 is a computer including a CPU 110, a memory 150, and an input/output interface (not illustrated). The memory 150 stores a printing process program (not illustrated), a first look-up table 161, a first coefficient table 171, a second coefficient table 172, and a first dot recording rate table 181. The first look-up table 161 defines the correspondence relation between data represented in an RGB format and ink values of a color system that can be represented by the printer 200. In this exemplary embodiment, the color system that can be represented by the printer 200 is a CMYK color system. The first coefficient table 171, the second coefficient table 172, and the first dot recording rate table 181 will be described below.

The CPU 110 loads the printing process program stored in the memory 150 and executes this program, to function as an image acquisition unit 111, an edge extractor 112, a color converter 121, and a halftone processor 122. It should be noted that the color converter 121 and the halftone processor 122 are also referred to as "dot data generator 120". The functions of these components and the printing process carried out by the printing system 10 will now be described.

Figure 3:
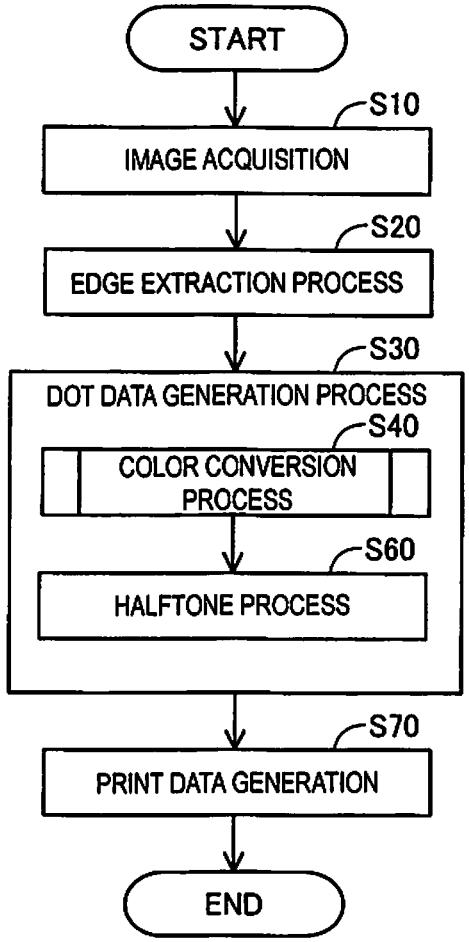
FIG. 3 is a flowchart illustrating a printing process.

FIG. 3 is a flowchart illustrating a printing process. The image acquisition unit 111 acquires image data from a personal computer (not illustrated) or the like connected to the image processing device 100 (step S10). In this exemplary embodiment, the image data has an RGB format.

The edge extractor 112 then carries out an edge extraction process for extracting edge pixels (step S20). The edge pixels reside along the two sides of a pixel border constituting an edge (contour) in an image.

Figure 4:
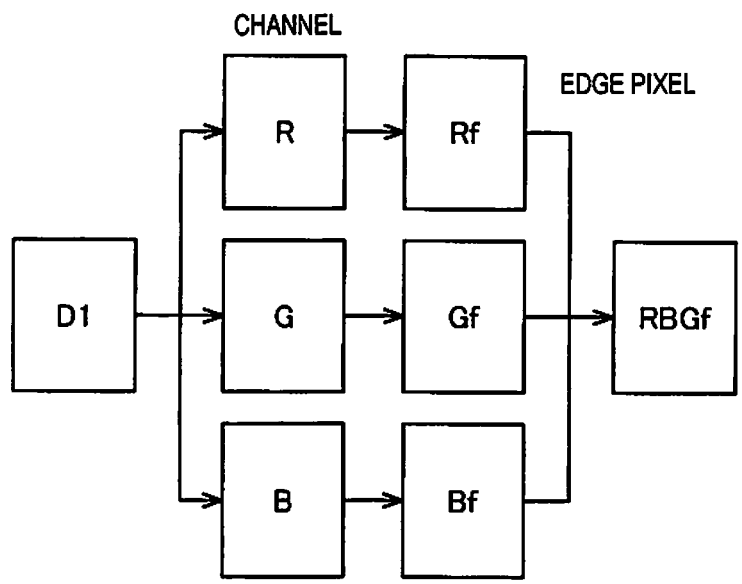
FIG. 4 is a conceptual diagram of an edge extraction process.

FIG. 4 is a conceptual diagram of an edge extraction process. The edge extractor 112 first separates image data Dl having an RGB format into channels of red R, green G, and blue B and extracts edge pixels (Rf, Gf, Bf) of the respective channels. The algorithm for edge pixel extraction will be described below. Then, the pixels residing at the positions determined to be edge pixels in the respective channels are merged, and the result is extracted as an edge pixel (RGBf).

Figure 5:
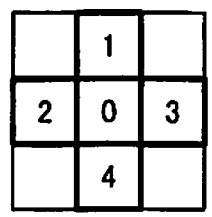
FIG. 5 is a matrix illustrating pixels to be calculated during an edge extraction process for each channel.

FIG. 5 is a matrix illustrating pixels to be calculated during an edge extraction process for each channel. The edge extractor 112 carries out an edge extraction process on a target pixel to be determined to be an edge pixel or not and four pixels (peripheral pixels) surrounding the target pixel among the 3×3 pixels. Among the 3×3 pixels illustrated in FIG. 5, a pixel 0 is the target pixel, pixels 1, 2, 3, and 4 are peripheral pixels for calculation of determination. Whether the target pixel is an edge pixel is determined based on the difference between the input value of the target pixel 0 and the respective input values of the peripheral pixels 1, 2, 3, and 4. The input values are calculated by the following expression (1). It should be noted that, among coefficients α1 to α3 in the following expression (1), only the coefficient corresponding to the channel to be determined for whether a pixel is an edge pixel is set to "1", and the other coefficients are set to "0". In the expression (1), R, G, and B represent tone values of the respective components.

$$\text{Input value} = \alpha_1 \cdot R + \alpha_2 \cdot G + \alpha_3 \cdot B \quad (1)$$

The edge extractor 112 determines whether the absolute value of the difference between the input value of the target pixel 0 and the maximum value (P1_max) among the input values of the peripheral pixels 1, 2, 3, and 4 or the absolute value of the different between the input value of the target pixel 0 and the minimum value (P1_min) among the input values of the peripheral pixels 1, 2, 3, and 4, whichever is the larger value, is larger than a threshold value. In detail, the edge extractor 112 inputs the input value calculated by the expression (1) to the following expression (2) and determines the target pixel 0 to be an edge pixel when the expression (2) is satisfied, or not to be an edge pixel when the expression (2) is not satisfied. Here, (P1_0) represents the input value of the target pixel, and (P1_1) to (P1_4) represent the input values of peripheral pixels. (P1_max) represents the maximum value among (P1_1) to (P1_4), and (P1_min) represents the minimum value among (P1_1) to (P1_4).

$$\text{Max}(|P1\_max - P1\_0|, |P1\_min - P1\_0|) > \text{threshold value} \quad (2)$$

Referring back to FIG. 3, after extraction of an edge pixel, the dot data generator 120 carries out a dot data generation process (step S30). Dot data indicates recording states of dots corresponding to image data for forming multiple dots on a printing medium P. The dot data generation process includes a color conversion process (step S40) and a halftone process (step S60).

Figure 6:
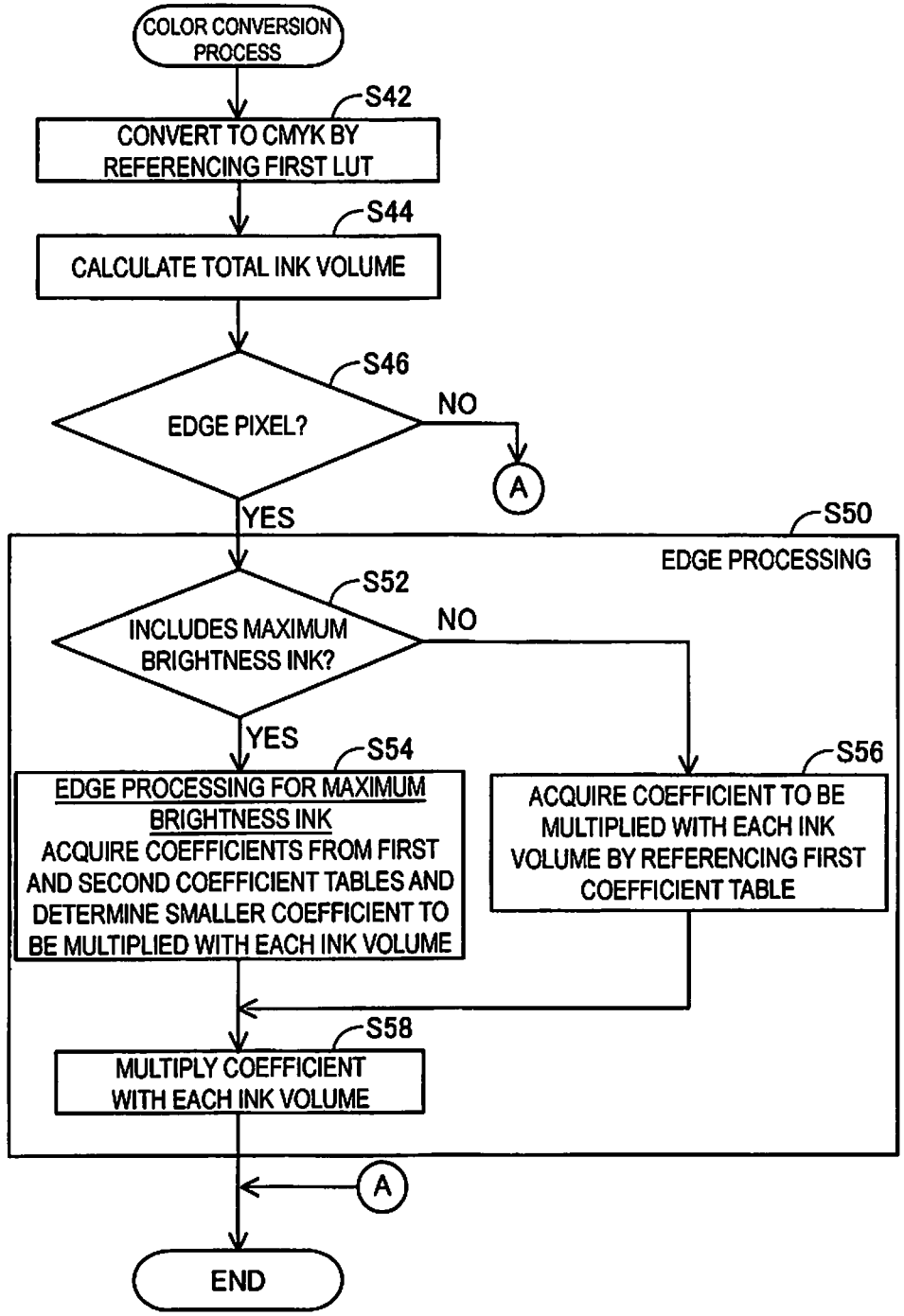
FIG. 6 is a flowchart illustrating a color conversion process.

FIG. 6 is a flowchart illustrating a color conversion process. The color converter 121 converts data having an RGB format to data of ink volume in a CMYK color system by referencing the first look-up table 161 (step S42). The color converter 121 calculates the total ink volume for each pixel in accordance with the ink volume data of each ink color (step S44).

For an edge pixel (YES in step S46), the color converter 121 carries out edge processing (step S50). Edge processing reduces the volume of ink discharged for a pixel in the image data when the pixel is an edge pixel to a value that is the product of the volume of ink discharged when the pixel is a non-edge pixel and a coefficient. Edge processing is performed to suppress the occurrence of bleeding at edges when an image is printed on a printing medium P.

In edge processing, when an edge pixel does not include the maximum brightness ink (NO in step S52), the color converter 121 acquires the coefficient to be multiplied with each ink volume by referencing the first coefficient table 171 (step S56).

Figure 7:
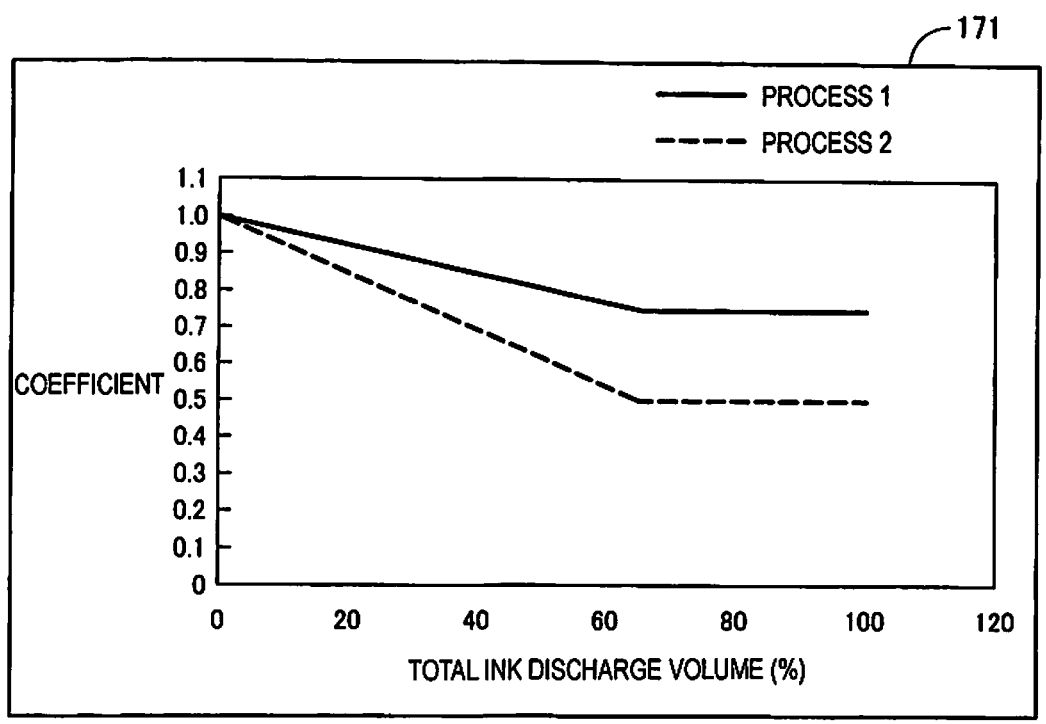
FIG. 7 is a diagram illustrating a first coefficient table.

FIG. 7 is a diagram illustrating the first coefficient table 171. The horizontal axis represents the total ink discharge volume, and the vertical axis represents coefficients. The total ink discharge volume is the volume of ink discharged per pixel where solid printing is 100%. In this exemplary embodiment, the printing system 10 can select the level of bleeding suppression between a process 1 and a process 2. The process 1 decreases the bleeding suppression to a relatively low level, whereas the process 2 increases the bleeding suppression to a level higher than that of the process 1. The solid line in FIG. 7 represent coefficients corresponding to the process 1, and the dashed line in FIG. 7 represents coefficients corresponding to the process 2. In response to receiving an assignment of the process 1 or 2 from a user via a predetermined user interface of the printing system 10 or a setting screen of a computer connected to the printing system 10, the color converter 121 acquires a coefficient corresponding to the assigned process. It should be noted that when a process is not assigned, the color converter 121 may acquire a coefficient corresponding to an assignment process (for example, the process 1) preliminarily stored in the memory 150. With reference to FIG. 7, the maximum value of the coefficient is 1.0, and the value of coefficient steadily decreases with the increase in the total ink discharge volume. The minimum value of the coefficient in the first coefficient table 171, i.e., the minimum value of the coefficient for when the edge pixel does not include the maximum brightness ink is approximately 0.5.

When the edge pixels do not include the maximum brightness ink, the color converter 121 acquires the coefficient corresponding to the total ink discharge volume by referencing the first coefficient table 171 and multiplies the acquired coefficient with each of the ink volumes (step S58).

Referring back to FIG. 6, when the edge pixel includes the maximum brightness ink (YES in step S52), the color converter 121 performs edge processing for maximum brightness ink (step S54). The edge processing for maximum brightness ink decreases the minimum value of the coefficient to be multiplied with the volume of ink discharged onto the edge pixel to a value smaller than the minimum value of the coefficient for when the edge pixel does not include the maximum brightness ink, when the inks to be discharged onto the edge pixel include the maximum brightness ink.

Figure 8:
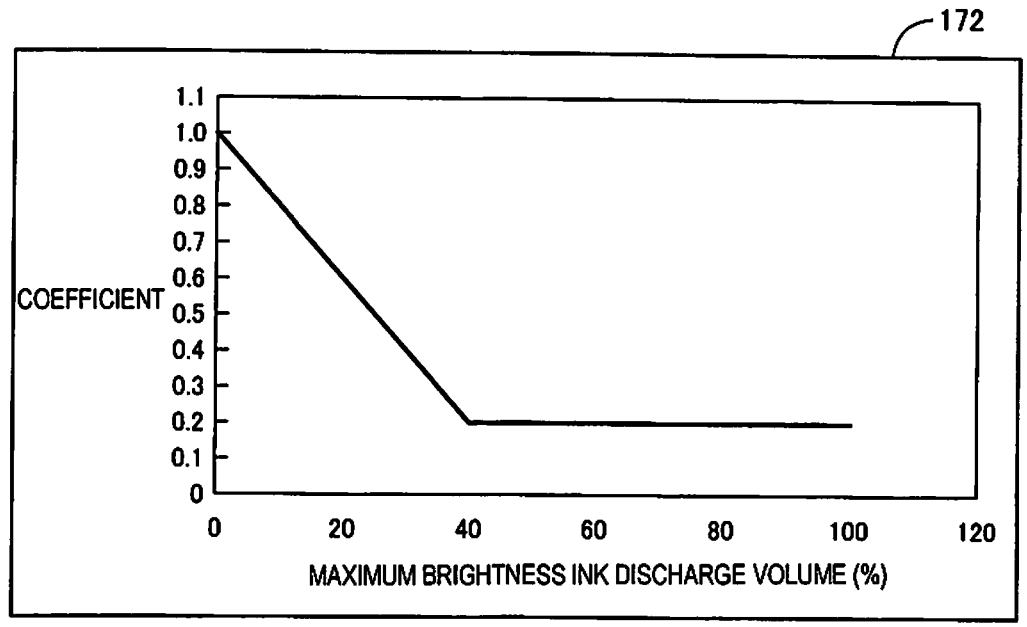
FIG. 8 is a diagram illustrating a second coefficient table.

FIG. 8 is a diagram illustrating a second coefficient table 172. The horizontal axis represents the maximum brightness ink discharge volume, and the vertical axis represents coefficients. The maximum brightness ink discharge volume is the volume of maximum brightness ink discharged per pixel where solid printing of the maximum brightness ink is 100%. With reference to FIG. 8, the maximum value of the coefficient is 1.0, and the value of the coefficient steadily decreases with the increase in the maximum brightness ink discharge volume. The minimum value of the coefficient in the second coefficient table 172, i.e., the minimum value of the coefficient for when the edge pixel includes the maximum brightness ink is approximately 0.2, which is smaller than the minimum value (approximately 0.5) of the coefficient for when the edge pixel does not include the maximum brightness ink.

In step S54 (FIG. 6), the color converter 121 acquires a coefficient based on the discharge volume of the maximum brightness ink corresponding to the edge pixel by referencing the second coefficient table 172. Furthermore, the color converter 121 acquires a coefficient based on the total ink discharge volume corresponding to the edge pixel by referencing the first coefficient table 171. The color converter 121 determines the smaller one of the acquired coefficients to be the coefficient to be multiplied with each ink volume. The color converter 121 multiplies the determined coefficient with each ink volume to calculate each ink volume for the edge pixel (step S58).

The color converter 121 skips the edge processing for a non-edge pixel (NO in step S46). A color conversion process is performed as described above.

The halftone processor 122 then refers to the first dot recording rate table 181 and performs a halftone process of the ink volume data, to prepare data indicating dot formation for each pixel (FIG. 3, step S60).

Figure 9:
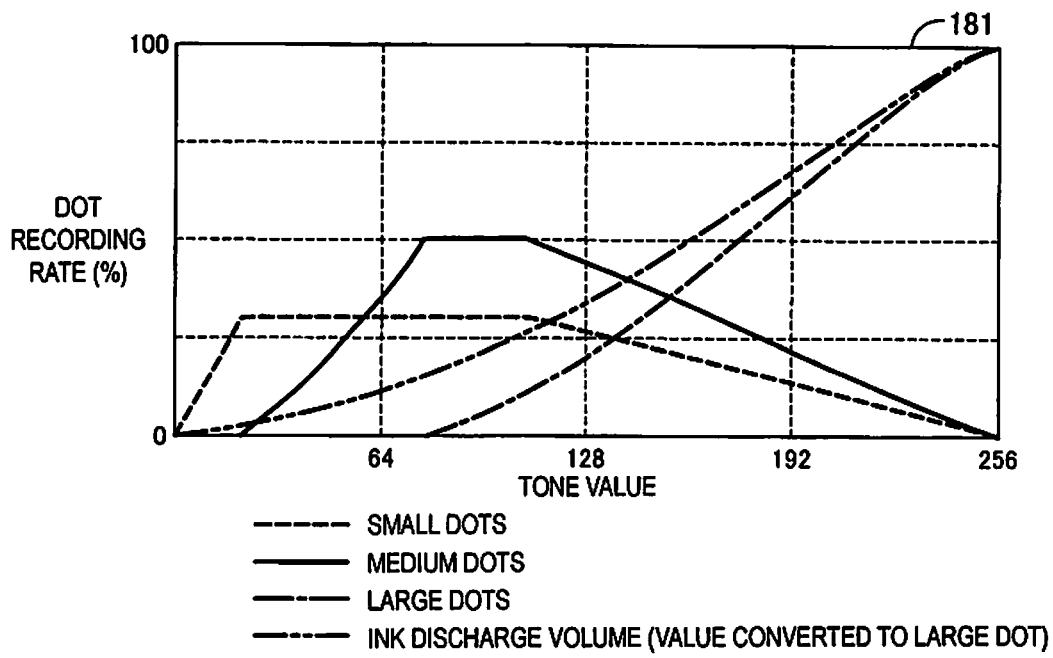
FIG. 9 is a diagram illustrating a first dot recording rate table.

FIG. 9 is a diagram illustrating the first dot recording rate table 181. In FIG. 9, the horizontal axis represents tone values of each ink color, and the vertical axis represents dot recording rates. The dot recording rate is the rate of small, medium, and large dots recorded in a pixel depending on the tone data of the pixel. The halftone processor 122 converts the ink volume data of each ink color to dot data including combinations of the three types of dots of small, medium, and large for each edge pixel and each non-edge pixel, by referencing the first dot recording rate table 181.

The CPU 110 then generates print data and outputs the print data to the printer 200 (FIG. 3, step S70). In detail, the CPU 110 carries out a rasterizing process to break down the data generated through the halftone process into the dot data for each main scanning pass. The CPU 110 adds a print control command to the rasterized data to generate print data and outputs the print data to the printer 200. The printer control unit 210 prints an image on a printing medium P based on the output print data. The print control command includes, for example, information involving the type of printing medium P and conveying data involving the conveying distance and speed of the printing medium P in the sub-scanning direction y during a single sub-scanning motion. It should be noted that the information involving the type of printing medium P may be output to the printer 200 separately from the print control command.

Figure 10:
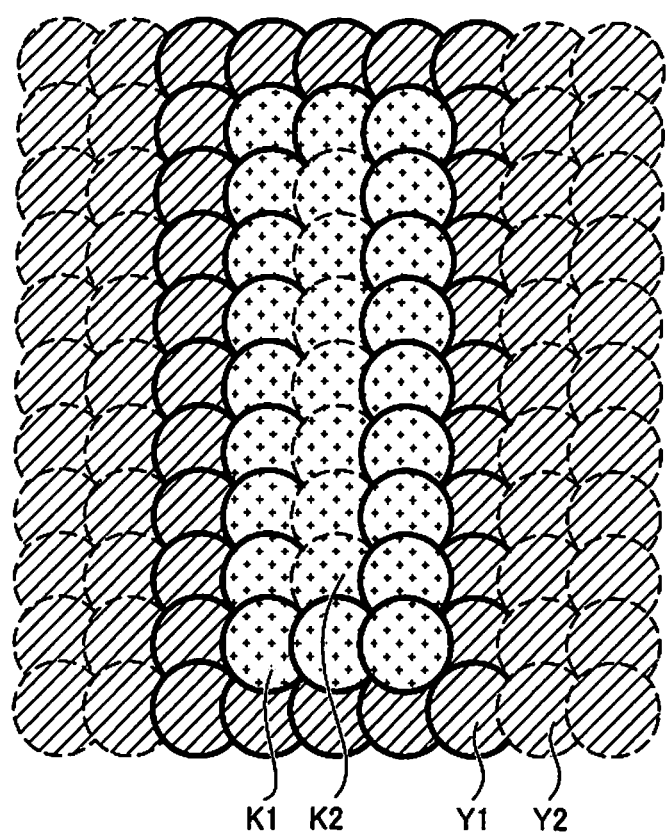
FIG. 10 is a diagram illustrating a dot image on which edge processing is not carried out.

FIG. 10 is a diagram illustrating a dot image on which edge processing is not carried out. FIG. 10 illustrates, as examples, dots Y1, Y2, K1, and K2 each formed with ink of the same volume. The dots Y1 and Y2 correspond to pixels formed solely of yellow ink, which is the maximum brightness ink according to this exemplary embodiment. The dots K1 and K2 correspond to pixels formed solely of black ink. The dots Y1 and K1 indicated by solid lines correspond to edge pixels, and the dots Y2 and K2 indicated by dashed lines correspond to non-edge pixels. The size of the dots represents the volume of the ink.

Figure 11:
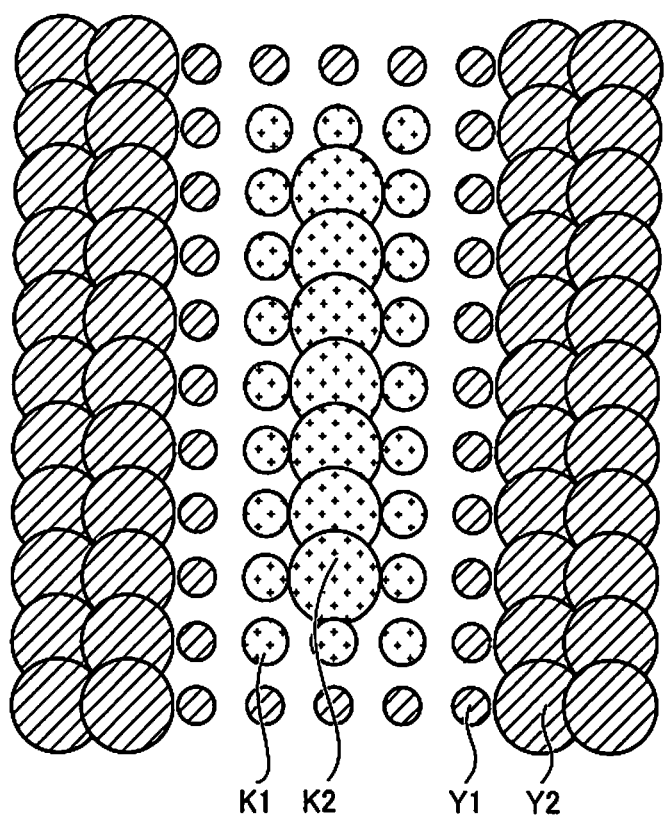
FIG. 11 is a diagram illustrating a dot image on which edge processing is carried out.

FIG. 11 is a diagram illustrating a dot image on which edge processing is carried out. By carrying out edge processing, the ink volumes of the dots Y1 and K1 corresponding to edge pixels are reduced in comparison to those of the dots Y2 and K2 corresponding to non-edge pixels. Furthermore, by carrying out edge processing for maximum brightness ink, the ink volume of the dot Y1 formed of yellow ink is reduced in comparison to that of the dot K1 not including yellow ink.

According to this exemplary embodiment, edge processing is carried out to reduce the volume of ink discharged onto a pixel in image data when the pixel is an edge pixel to a value that is the product of the volume of ink discharged when the pixel is a non-edge pixel and a coefficient. Thus, the occurrence of bleeding can be suppressed at edges of the printed image. Furthermore, since the minimum value of the coefficient for when the ink discharged onto the edge pixel includes the maximum brightness ink is reduced to a value smaller than the minimum value of the coefficient for when the maximum brightness ink is not included, the occurrence of bleeding can be suppressed even when the maximum brightness ink, which emphasizes bleeding, is discharged along an edge.

According to this exemplary embodiment, since the coefficient acquired through edge processing can be multiplied with the ink volume of each ink to calculate the ink volume of the edge pixel, the ink volume of the edge pixels can be readily determined.

It is presumed that bleeding of the maximum brightness ink is emphasized due a large difference between the brightness value of the maximum brightness ink dots and the brightness values of the other ink dots. It should be noted that the inventors confirmed that even when the volume of ink discharged onto pixels is reduced to a value smaller than that for when the inks discharged onto the pixels do not include the maximum brightness ink through the edge processing for when the maximum brightness ink is included, the printing medium P is not visible. It is presumed that this is caused by a difference between the brightness value of the maximum brightness ink dots and the brightness value of the printing medium smaller than the difference between the brightness values of other ink dots and the brightness value of the printing medium.

Second Exemplary Embodiment

Configurations different from those of the first exemplary embodiment will now be described. In the second exemplary embodiment, the dot data generator 120 generates dot data through different processes corresponding to a first print mode in which the printing medium P is a first medium and a second print mode in which the printing medium P is a second medium.

Figure 12:
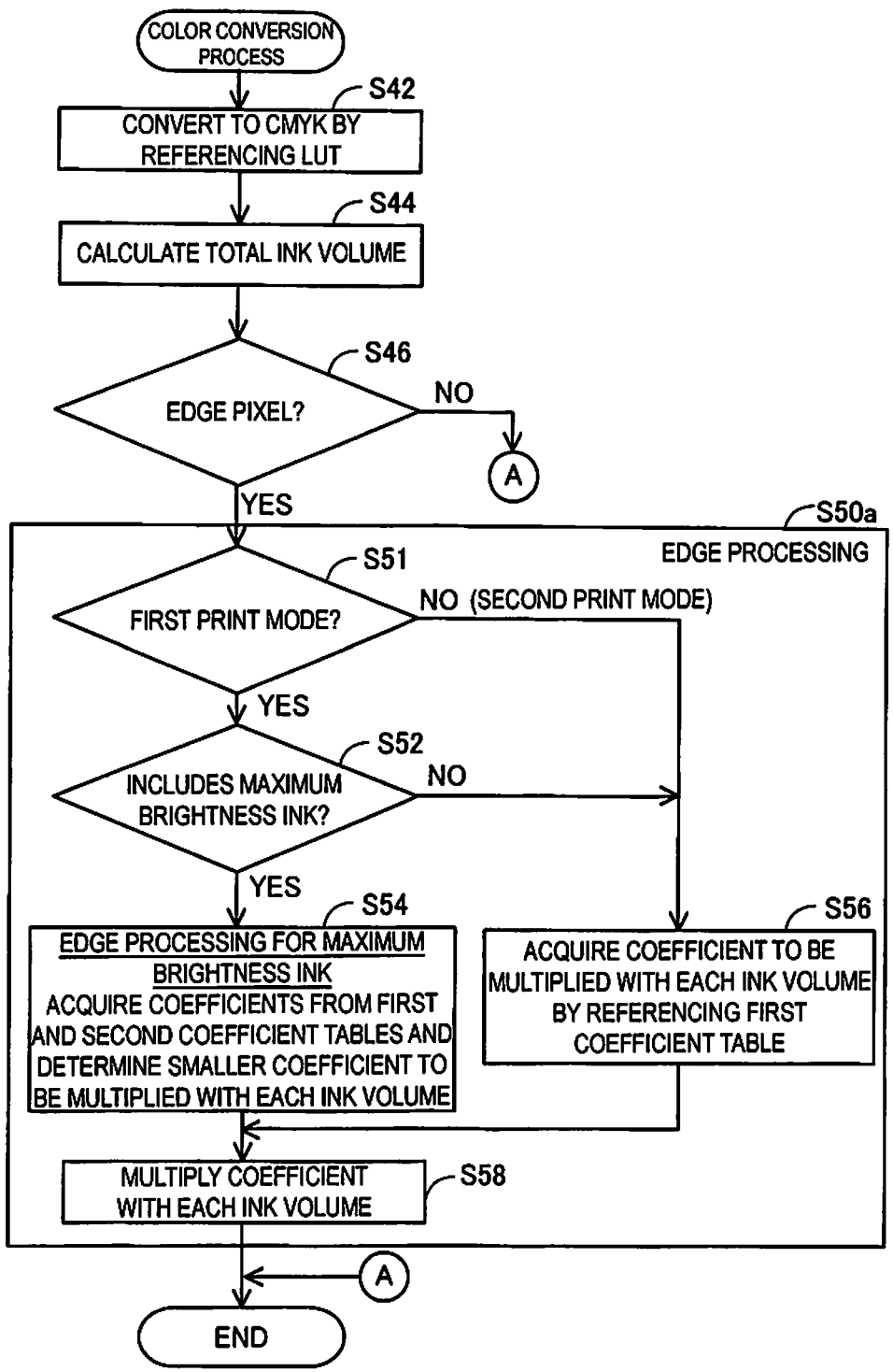
FIG. 12 is a flowchart illustrating a color conversion process according to a second exemplary embodiment.

FIG. 12 is a flowchart illustrating a color conversion process according to the second exemplary embodiment. It should be noted that reference signs that are the same as the above-described exemplary embodiment indicate the same configurations as those in the above-described exemplary embodiment, and thus the foregoing descriptions should be referred to for these configurations. In edge processing (step S50a), the color converter 121 determines the print mode (step S51). The print mode can be assigned by a user via a predetermined user interface of the printing system 10 or a setting screen of a computer connected to the printing system 10.

When the first print mode is assigned (YES in step S51), and when the edge pixels include the maximum brightness ink (YES in step S52), the color converter 121 carries out edge processing for maximum brightness ink (step S54), as described above in the first exemplary embodiment.

When the second print mode is assigned (NO in step S51), the color converter 121 sets the minimum value of the coefficient for when the inks discharged onto the edge pixel include the maximum brightness ink to be the same value as the minimum value of the coefficient for when the inks discharged onto the edge pixel do not include the maximum brightness ink. In this exemplary embodiment, regardless of the edge pixel including the maximum brightness ink, the color converter 121 acquires the coefficient to be multiplied with each ink volume from the first coefficient table 171 (step S56) and multiplies the acquired coefficient with each ink volume (step S58). Descriptions of other processes in the color conversion process are omitted here because they are the same as those in the first exemplary embodiment.

According to this exemplary embodiment, the occurrence of bleeding of inks at the edges can be suppressed in the first print mode. Furthermore, the occurrence of bleeding of the maximum brightness ink at the edges can be suppressed in the second print mode.

Third Exemplary Embodiment

Configurations different from those of the second exemplary embodiment will be described. In the third exemplary embodiment, when the same volume of ink is discharged on a first medium and a second medium, a diameter of dots formed on the first medium is smaller than a diameter of dots formed on the second medium. In other words, the first medium has wettability of ink lower than that of the second medium and reduces the spreading of ink. For example, when the ink volume per dot is 30 ng, the diameter of the dots formed on the first medium is 63 μm, and the diameter of the dots formed on the second medium is 110 μm.

In this exemplary embodiment, when the first print mode that uses the first medium is assigned, the dot data generator 120 may increase the total ink discharge volume per pixel to a volume larger than that in the second print mode. For example, the color converter 121 may convert the data having an RGB format to data of ink volume in a CMYK color system and then multiply the ink volume of each ink with a predetermined value, to increase the ink volume.

In this exemplary embodiment, when the first medium on which ink spreads less readily than the second medium is used, generation of bleeding of the maximum brightness ink at the edges can be suppressed.

Fourth Exemplary Embodiment

Figure 13:
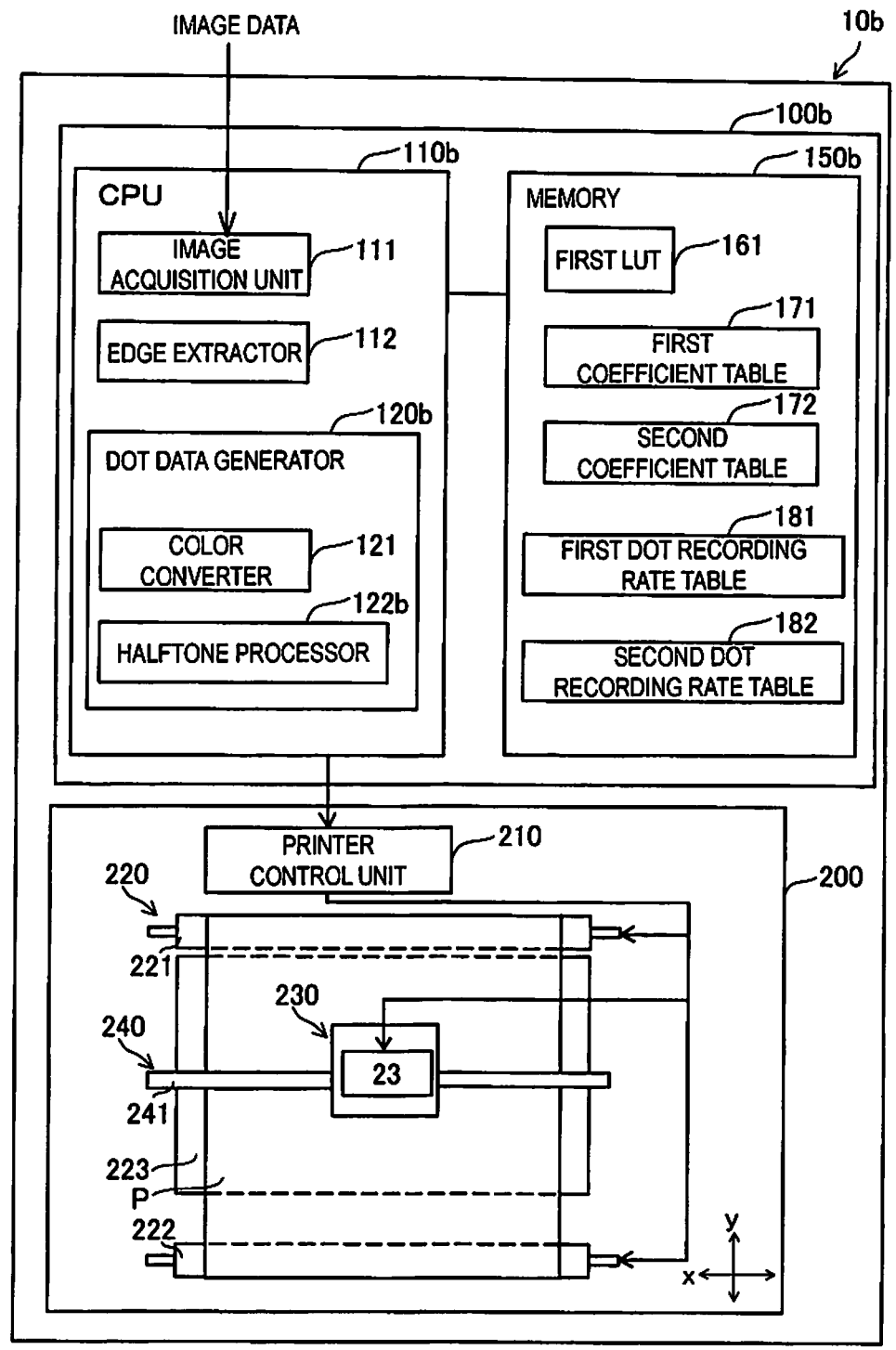
FIG. 13 is a diagram illustrating a schematic configuration of a printing system according to a fourth exemplary embodiment.

FIG. 13 is a diagram illustrating a schematic configuration of a printing apparatus 10b according to the fourth exemplary embodiment. Configurations different from those of the first exemplary embodiment will now be described.

A CPU 110b of an image processing device 100b controls a printer control unit 210 to perform bidirectional printing in which a printing head 23 is reciprocated in the main scanning direction x, and ink is discharged during both the forward and backward scanning motions, to form dots.

In some cases, positional misalignment may occur during the bidirectional printing in which the positions of the dots formed during forward and backward scanning motions are misaligned in the main scanning direction x. Thus, the CPU 110b prints out a test pattern before printing out an image corresponding to image data. The test pattern is used for adjusting the recording timing of dots during the forward and backward scanning motions. The test pattern, for example, includes straight lines formed at a predetermined pitch during the forward scanning motion and straight lines formed at a predetermined pitch larger than that of the straight lines formed during the forward scanning motion. A memory 150b preliminarily stores a test pattern and the dot size of the test pattern.

Figure 14:
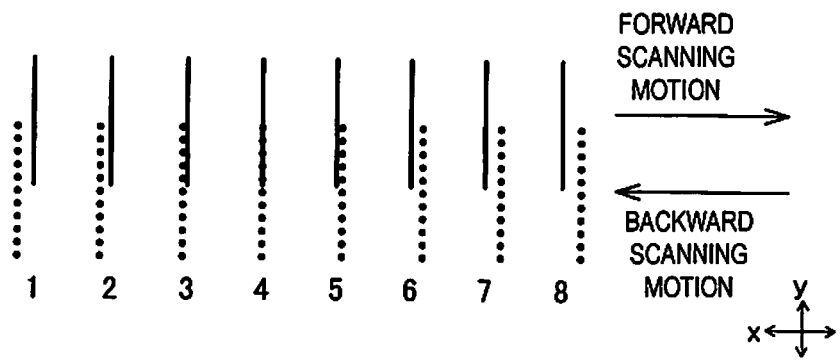
FIG. 14 is a diagram illustrating an example of a test pattern.

FIG. 14 is a diagram illustrating an example of a test pattern. In this exemplary embodiment, medium dots form the test pattern, and the test pattern includes pairs of straight lines extending in the sub-scanning direction. Misalignment adjustment numbers 1 to 8 are printed below the pairs of straight lines. In the example illustrated in FIG. 14, the test pattern in the forward scanning motion is indicated by dotted lines for convenience. However, these dotted lines are actually solid lines like in the backward scanning motion. In the example illustrated in FIG. 14, the pair of straight lines indicated by the adjustment number 4 include dots formed in positions aligned in the main scanning direction x.

The CPU 110b receives an assignment of an adjustment number from a user, instructs the printer control unit 210 to correct the dot formation timing with a correction value of the dot formation timing corresponding to the adjustment number, and performs bidirectional printing.

A printing process according to this exemplary embodiment will now be described. In this exemplary embodiment, a halftone processor 122b of a dot data generator 120b carries out a halftone process on non-edge pixels by referencing a first dot recording rate table 181, as in the first exemplary embodiment. The halftone processor 122b carries out a halftone process on edge pixels by referencing a second dot recording rate table 182 that defines the use of dots having a size larger than that of the dots in the test pattern printing.

Figure 15:
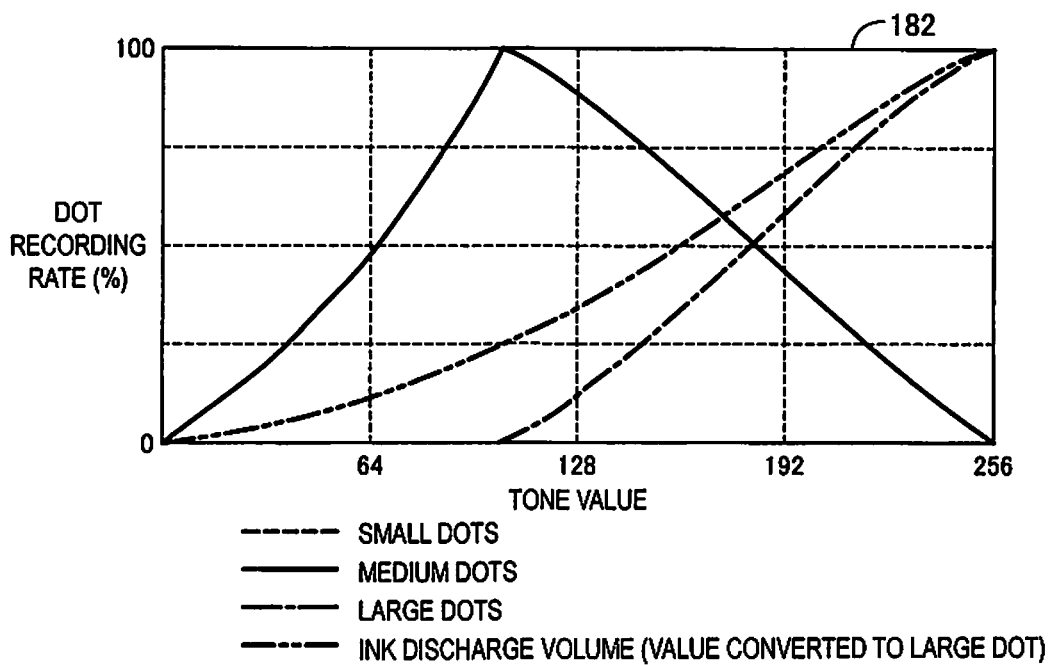
FIG. 15 is a diagram illustrating a second dot recording rate table.

FIG. 15 is a diagram illustrating the second dot recording rate table 182. In FIG. 15, the horizontal axis represents tone values of each ink color, and the vertical axis represents dot recording rates. In the second dot recording rate table 182, the recording rate of small dots is zero for all tone values. The halftone processor 122 converts the ink volume data of each ink color of edge pixels to dot data including combinations of the two types of dots of medium and large by referencing the second dot recording rate table 182.

In this exemplary embodiment, since the dot data is generated with dots having a size larger than that of the dots of the test pattern, unevenness due to misalignment of the positions of the dots formed at the edges can be suppressed.

Fifth Exemplary Embodiment

Figure 16:
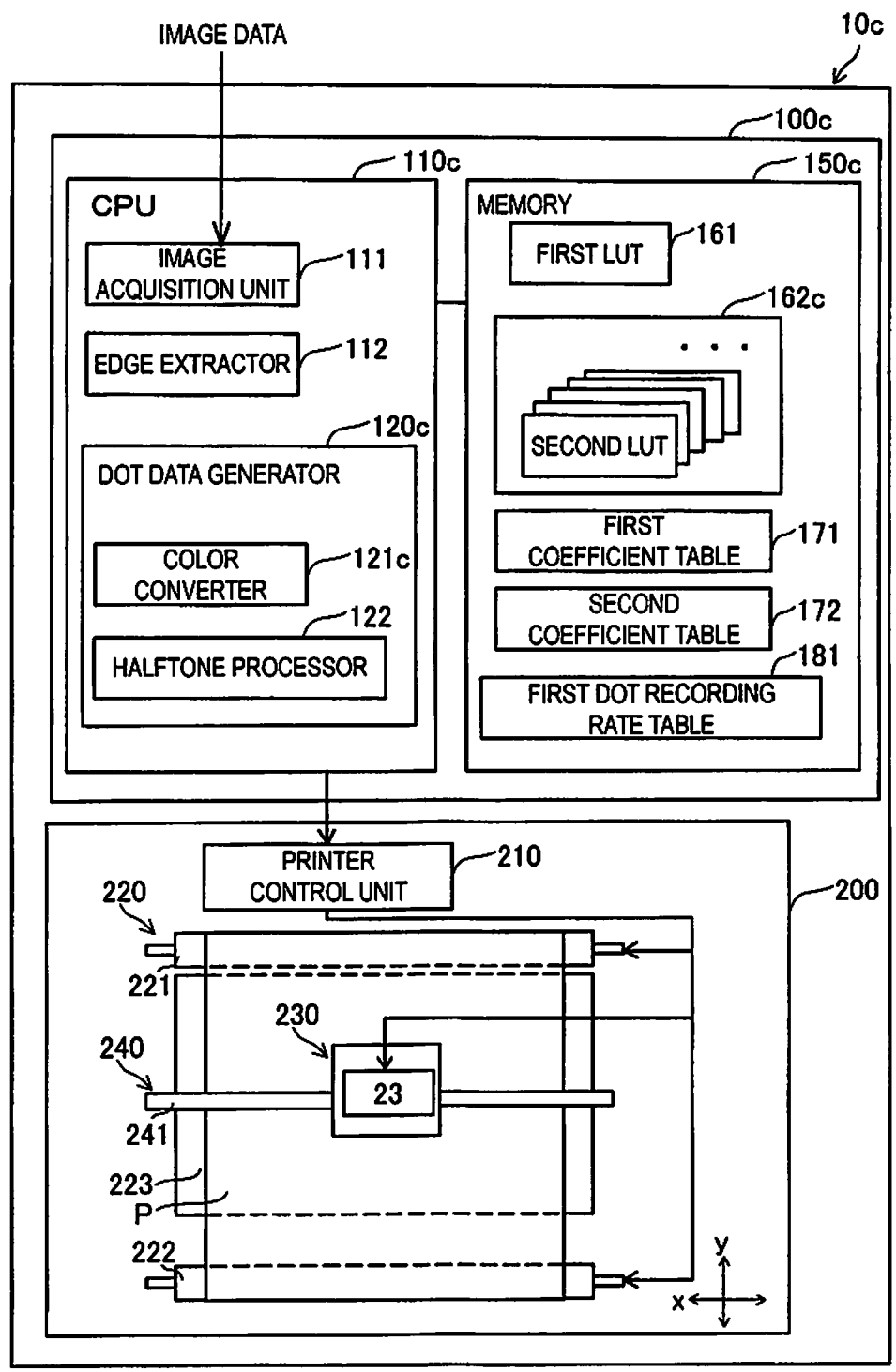
FIG. 16 is a diagram illustrating a schematic configuration of a printing system according to a fifth exemplary embodiment.

FIG. 16 is a diagram illustrating a schematic configuration of a printing apparatus 10c according to a fifth exemplary embodiment. Configurations different from those of the first exemplary embodiment will now be described.

A memory 150c of an image processing device 110c stores multiple second look-up tables 162c. The second look-up tables 162c are provided for each coefficient acquired through edge processing. In this exemplary embodiment, a dot data generator 120c serving as a functional unit of a CPU 110c calculates ink volume data of an edge pixel by referencing the second look-up tables 162c.

Figure 17:
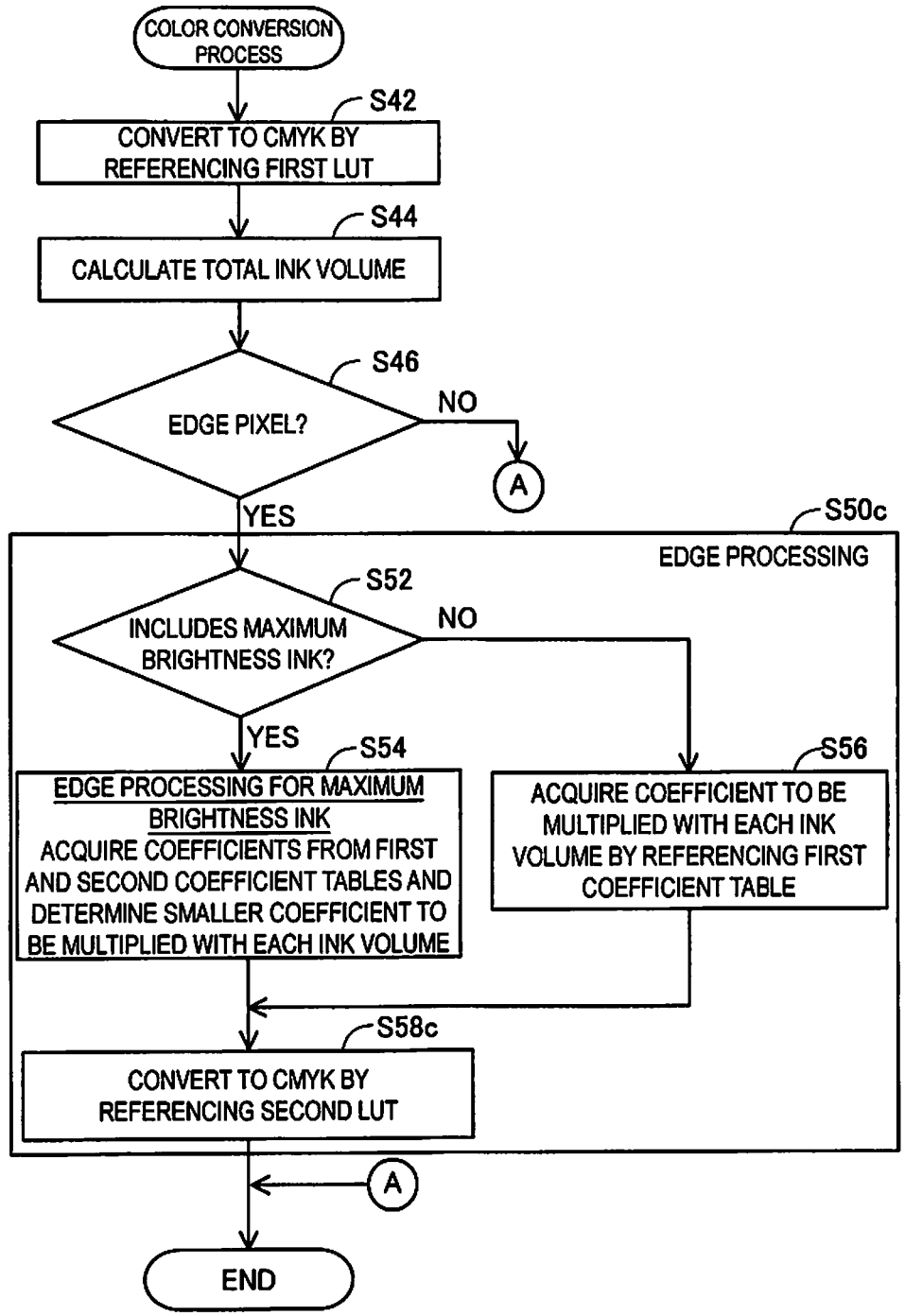
FIG. 17 is a flowchart illustrating a color conversion process according to a fifth exemplary embodiment.

FIG. 17 is a flowchart illustrating a color conversion process according to the fifth exemplary embodiment. In the edge processing according to the first exemplary embodiment, the color converter 121 multiplies the acquired coefficient with each ink volume to calculate the ink volume data for the edge pixel. In the edge processing according to the fifth exemplary embodiment (step S50c), a color converter 121c acquires a coefficient (steps S54 and S56) and converts data having an RGB format to data of ink volume corresponding to a CMYK color system by referencing a second look-up table 162c corresponding to the coefficient (step S58c). Descriptions of other processes in the color conversion process are omitted here because they are the same as those in the first exemplary embodiment.

According to this exemplary embodiment, occurrence of bleeding at the edges in a printed image can be suppressed, as in the first exemplary embodiment. Furthermore, since the minimum value of the coefficient for when the inks discharged onto the edge pixel includes the maximum brightness ink is decreased to a value smaller than the minimum value of the coefficient for when the maximum brightness ink is not included, bleeding of maximum brightness ink can be suppressed along an edge.

Another Exemplary Embodiment 1

The printing head 23 may include a nozzle array including nozzles that discharge a clear ink CL. The clear ink CL can promote the spreading of other inks. The clear ink CL includes substantially no colorants and thus has little or none effect on the tone of the printed image. The dot data generators 120, 120b, and 120c may generate dot data such that the clear ink CL is discharged onto non-edge pixels and not onto edge pixels. For example, the dot data generators 120, 120b, and 120c may convert the tone value of the clear ink CL to "0" in the color-converted image data for the edge pixels. Alternatively, the dot data generators 120, 120b, and 120c may replace the halftone data of the clear ink CL acquired through a halftone process to data indicating no dots for the edge pixels. In this exemplary embodiment, spreading of ink can be promoted in the non-edges, and the occurrence of bleeding can be suppressed at the edges.

Another Exemplary Embodiment 2

When the format of the image data is the CMYK color system, the edge extractor 112 may calculate the input value by the following expression (3), in place of the above-described expression (1). In such a case, the edge extractor 112 sets only the coefficient corresponding to the channel to be determined for whether a pixel is an edge pixel to "1" and the other coefficients to "0", among coefficients β1 to β4 in the expression (3).

$$\text{Input value}=\beta 1\cdot C+\beta 2\cdot M+\beta 3\cdot Y+\beta 4\cdot K \quad (3)$$

Another Exemplary Embodiment 3

When the format of the image data is ink volume, the edge extractor 112 may calculate the input value by the following expression (4), in place of the above-described expression (1). The expression (4) represents an example of a case in which the inks of multiple colors used by the printer 200 include cyan ink C, magenta ink M, yellow ink Y, black ink K, orange ink Or, and green ink Gr, and the expression (4) may be modified depending on the number of ink colors. The edge extractor 112 sets only the coefficient corresponding to the channel to be determined for whether a pixel is an edge pixel to "1" and the other coefficients to "0", among coefficients γ1 to γ6.

$$\text{Input value}=\gamma 1\cdot C+\gamma 2\cdot M+\gamma 3\cdot Y+\gamma 4\cdot K+\gamma 5\cdot Or+\gamma 6\cdot Gr \quad (4)$$

Another Exemplary Embodiment 4

The ink used by the printer 200 may include white ink Wh. The white ink Wh is used for forming an underlayer of an image to be printed on a printing medium P with other inks. The printer control unit 210 may discharged the white ink Wh from the nozzles before the other inks under the control of the CPU 110, 110b, or 110c, to form an underlayer on the printing medium P. The image data of the white ink Wh includes a single channel of white ink Wh. The input value for determining whether a pixel of the image data of the white ink Wh is an edge pixel can be calculated by the following expression (5).

$$\text{Input value} = \omega 1 \cdot Wh \tag{5}$$

Another Exemplary Embodiment 5

In the second and third exemplary embodiments, when a user does not assign a print mode, the CPU 110 and 110b may determine the print mode by determining whether the printing medium P is a first medium or a second medium through the method described below. For example, the printer control unit 210 discharges ink of a predetermined volume on the printing medium P before printing an image under the control of the CPU 110 or 110b and measures the ink diameter on the printing medium P with an image capturing device disposed on the printer 200. When the ink diameter is smaller than a threshold value stored in the memory 150 or 150b, the CPU 110 or 110b determines that the printing medium P is the first medium, whereas when the ink diameter is larger than or equal to the threshold, the CPU 110 or 110b determines the printing medium P to be the second medium.

Another Exemplary Embodiment 6

In the exemplary embodiments described above, the color converters 121, 121b, and 121c acquire the coefficient to be multiplied by the ink volume by referencing the first coefficient table 171 and the second coefficient table 172. In contrast, a relational expression of ink discharge volumes and coefficients may be stored in the memories 150, 150b, and 150c, and the color converter 121 may use the relational expression to acquire a coefficient.

Another Exemplary Embodiment 7

In the exemplary embodiments described above, the printing systems 10, 10b, and 10c including the image processing devices 100, 100b, and 100c, respectively, and the printer 200 carry out printing. Alternatively, the printer 200 may receive image data from cameras and various memory cards and carry out printing. In specific, a CPU (not illustrated) of the printer control unit 210 of the printer 200 may perform a process equivalent to the above-described color conversion process and halftone process, to carry out printing.

Other Exemplary Embodiments

The present disclosure is not limited to the exemplary embodiments described above, but may be implemented in various embodiments without departing from the spirits of the invention. For example, the present disclosure may be achieved through the following exemplary embodiments. Appropriate replacements or combinations may be made to the technical features in the exemplary embodiments which correspond to the technical features in the exemplary embodiments described below to solve some or all of the problems described above or to achieve some or all of the advantageous effects of the disclosure. Any of the technical features may be deleted as appropriate unless the technical feature is described in the specification as indispensable.

(1) An exemplary embodiment of the present disclosure provides a printing apparatus configured to print an image by discharging inks of different colors from a printing head including nozzles that respectively discharge the inks of different colors onto a printing medium and forming multiple dots. The printing apparatus includes an edge extractor configured to extract an edge pixel constituting a contour of the image from image data, and a dot data generator configured to generate dot data indicating a recording state of a plurality of dots corresponding to the image data, the dot data being for forming the plurality of dots on the printing medium. The dot data generator performs edge processing on a pixel in the image data to reduce the volume of ink discharged when the pixel is the edge pixel to a value that is the product of the volume of ink discharged when the pixel is a non-edge pixel and a coefficient, and the edge processing includes edge processing for maximum brightness ink for making the minimum value of the coefficient for when the inks discharged onto the edge pixel include the maximum brightness ink having the highest brightness among the inks of different colors smaller than the minimum value of the coefficient for when the inks discharged onto the edge pixel do not include the maximum brightness ink.

According to this exemplary embodiment, edge processing is carried out to reduce the volume of ink discharged onto a pixel in image data when the pixel is an edge pixel to a value that is the product of the volume of ink discharged when the pixel is a non-edge pixel and a coefficient. Thus, the occurrence of bleeding can be suppressed at edges of the printed image. Furthermore, since the minimum value of the coefficient for when the inks discharged onto the edge pixel include the maximum brightness ink is decreased to a value smaller than the minimum value of the coefficient for when the yellow ink is not included, the occurrence of bleeding can be suppressed even when the maximum brightness ink, which emphasizes bleeding, is discharged along the edge.

(2) In the above-described exemplary embodiment, the dot data generator may generate the dot data through processing corresponding to a first print mode in which the printing medium is a first medium and a second print mode in which the printing medium is a second medium, carry out the edge processing for maximum brightness ink in the first print mode, and, in the second print mode of the edge processing, the minimum value of the coefficient for when the inks discharged onto the edge pixels include the maximum brightness ink may be set to the same value as the minimum value of the coefficient for when the inks discharged onto the edge pixel do not include the maximum brightness ink.

According to this exemplary embodiment, the occurrence of bleeding of inks at the edges can be suppressed in the first print mode. Furthermore, the occurrence of bleeding of the maximum brightness ink at the edges can be suppressed in the second print mode.

(3) In the third exemplary embodiment, when the same volume of inks is discharged on the first medium and the second medium, the diameter of dots formed on the first medium may be smaller than the diameter of dots formed on the second medium.

In this exemplary embodiment, when the first medium on which ink spreads less readily than the second medium is used, the occurrence of bleeding of the maximum brightness ink at the edges can be suppressed.

(4) In the above-described exemplary embodiment, the inks of different colors may include a clear ink that can promote spreading of the other inks, and the dot data generator may generate dot data such that the clear ink is discharged onto the non-edge pixels and not onto the edge pixels.

In this exemplary embodiment, the spreading of inks can be promoted in the non-edges, and the occurrence of bleeding can be suppressed at the edges.

(5) In the above-described exemplary embodiment, the printing apparatus can form dots having different sizes on the printing medium and can carry out bidirectional printing in which the printing head is reciprocated in the main scanning direction or the width direction of the printing medium and inks are discharged during both the forward and backward scanning motions of the printing head, and the dot data generator may set the size of the dots of the edge pixels to a size larger than or equal to the size of the dots printed on the test pattern for adjusting the dot formation timing during the forward and backward scanning motions during the bidirectional printing.

In this exemplary embodiment, since the size of the dots of the edge pixels are larger than or equal to the size of the dots of a test pattern printed for timing adjustment of the bidirectional printing, unevenness due to misalignment of the positions of the dots formed at the edges can be suppressed.

(6) Another exemplary embodiment of the present disclosure provides a method of printing an image on a printing medium with inks of different colors. The method of printing includes extracting an edge pixel constituting a contour of the image from image data, and generating dot data indicating a recording state of plurality of dots corresponding to the image data, the dot data being for forming the plurality of dots on the printing medium. In the generating of the dot data, edge processing is performed on a pixel in the image data to reduce the volume of ink discharged when the pixel is the edge pixel to a value that is the product of the volume of ink discharged when the pixel is a non-edge pixel and a coefficient, and the edge processing includes edge processing for maximum brightness ink for making the minimum value of the coefficient for when the inks discharged onto the edge pixel include the maximum brightness ink having the highest brightness among the inks of different colors smaller than the minimum value of the coefficient for when the inks discharged onto the edge pixel do not include the maximum brightness ink.

According to this exemplary embodiment, edge processing is carried out to reduce the volume of ink discharged onto a pixel in image data when the pixel is an edge pixel to a value that is the product of the volume of ink discharged when the pixel is a non-edge pixel and a coefficient. Thus, the occurrence of bleeding can be suppressed at edges of the printed image. Furthermore, since the minimum value of the coefficient for when the inks discharged at the edge pixel include the maximum brightness ink is decreased to a value smaller than the minimum value of the coefficient for when the maximum brightness ink is not included, bleeding of maximum brightness ink, which emphasizes bleeding, can be suppressed along the edge.

Various embodiments of the present disclosure besides the printing apparatus may be implemented. For example, the present disclosure can be implemented in many forms including a method of processing edges, a method of printing, a method of image processing by the image processing device 100, a computer program for performing these methods, and a non-transitory storage medium storing the computer program.

This application claims priority under 35 U.S.C. § 119 to Japanese Patent Application No. 2018-031607, filed Feb. 26, 2018. The entire disclosure of Japanese Patent Application No. 2018-031607 is hereby incorporated herein by reference.

What is claimed is:

1. A printing apparatus configured to print an image by discharging inks from a printing head including nozzles respectively discharging the inks of different colors on a printing medium and forming a plurality of dots on the printing medium, the printing apparatus comprising:
   an edge extractor configured to extract an edge pixel constituting a contour of the image from image data; and
   a dot data generator configured to generate dot data indicating a recording state of a plurality of dots corresponding to the image data, the dot data being for forming the plurality of dots on the printing medium, wherein
   the dot data generator performs edge processing on a pixel in the image data to reduce a volume of ink discharged when the pixel is the edge pixel to a value that is the product of a volume of ink discharged when the pixel is a non-edge pixel and a coefficient, and
   the edge processing includes edge processing for maximum brightness ink for making a minimum value of the coefficient for when the inks discharged onto the edge pixel include a maximum brightness ink having a highest brightness among the inks of different colors smaller than a minimum value of the coefficient for when the inks discharged onto the edge pixel do not include the maximum brightness ink.

2. The printing apparatus according to claim 1, wherein
   the dot data generator is configured to generate the dot data through different processes corresponding to a first print mode in which the printing medium is a first medium and a second print mode in which the printing medium is a second medium,
   the edge processing for maximum brightness ink is performed in the first print mode, and
   in the second print mode, the minimum value of the coefficient for when the inks discharged onto the edge pixel include the maximum brightness ink is set to the same value as the minimum value of the coefficient for when the inks discharged onto the edge pixel do not include the maximum brightness ink.

3. The printing apparatus according to claim 2, wherein when the same volume of inks is discharged on the first medium and the second medium, a diameter of dots formed on the first medium is smaller than a diameter of dots formed on the second medium.

4. The printing apparatus according to claim 1, wherein
   the inks of different colors include a clear ink that promotes spreading of other inks, and
   the dot data generator is configured to generate the dot data such that the clear ink is discharged onto the non-edge pixel and not onto the edge pixel.

5. The printing apparatus according to claim 1, wherein
   the printing apparatus is configured to form dots having different sizes on the printing medium and to carry out bidirectional printing in which the printing head is reciprocated in a main scanning direction or a width direction of the printing medium and the inks are discharged during both a forward scanning motion and a backward scanning motion of the printing head, and
   the dot data generator is configured to set a size of dots of the edge pixel to a size larger than or equal to a size of dots for test pattern printing for adjusting a dot formation timing during the forward scanning motion and the backward scanning motion during the bidirectional printing.

6. A method of printing an image on a printing medium with inks of different colors, the method comprising:
  extracting an edge pixel constituting a contour of the image from image data; and
  generating dot data indicating a recording state of a plurality of dots corresponding to the image data, the dot data being for forming the plurality of dots on the printing medium, wherein
  in the generating of the dot data, edge processing is performed on a pixel in the image data to reduce a volume of ink discharged when the pixel is the edge pixel to a value that is the product of a volume of ink discharged when the pixel is a non-edge pixel and a coefficient, and
  the edge processing includes edge processing for maximum brightness ink for making a minimum value of the coefficient for when the inks discharged onto the edge pixel include a maximum brightness ink having a highest brightness among the inks of different colors smaller than a minimum value of the coefficient for when the inks discharged onto the edge pixel do not include the maximum brightness ink.

* * * * *